F. W. HOCHSTETTER.
DEVICE FOR EXHIBITING MOVING PICTURES.
APPLICATION FILED JAN. 9, 1913.
1,226,663.
Patented May 22, 1917.
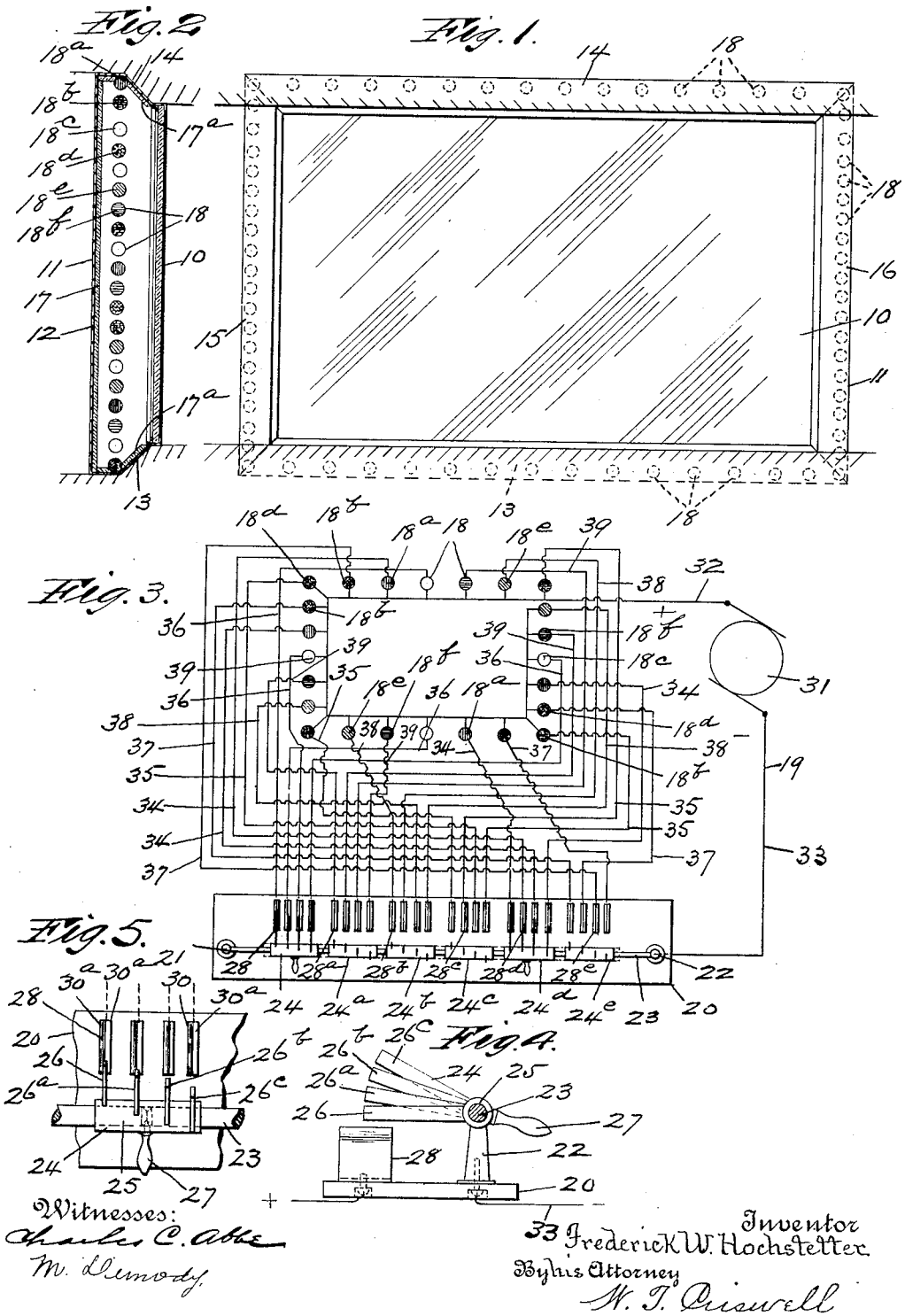

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

DEVICE FOR EXHIBITING MOVING PICTURES.

1,226,663.     Specification of Letters Patent.     Patented May 22, 1917.

Application filed January 9, 1913. Serial No. 741,022.

*To all whom it may concern:*

Be it known that I, FREDERICK W. HOCHSTETTER, a subject of the Emperor of Germany, and a resident of New York, county and State of New York, have invented a certain new and useful Improvement in Devices for Exhibiting Moving Pictures, of which the following is a full, clear, and exact specification.

This invention relates more particularly to a class of devices adapted to be used for displaying motion pictures.

My invention has for its object primarily to provide a device for exhibiting moving pictures designed to be employed especially as a curtain on which the pictures produced upon transparent films, or slides may be projected, and which is adapted to be illuminated in a manner so that the pictures will be shown in effective and attractive colorings, thus dispensing with the requirement for using films, or slides having the pictures thereof tinted in colors. This is accomplished mainly by providing a device wherein is employed a form of curtain of plate glass or other translucent material which is supported in a frame, or the like suitably positioned so that the pictures may be projected thereon, and by the use of incandescent lamps of various hues the desired color effects are deflected upon the curtain simultaneously with the projection of the pictures.

Another object of the invention is to provide an electric circuit serving to permit one, or more lamps of a single color, or a combination of colors to be simultaneously, or alternately lighted for deflection upon the curtain; and a further object of the invention is to provide means adapted to be operated whereby the circuit of electricity may be controlled by the operator of the projecting machine, or otherwise if preferred.

With these and other objects in view, the invention will be hereinafter more particularly described with reference to the accompanying drawing, which forms a part of this specification, and will then be pointed out in the claims at the end of the description.

In the drawing, Figure 1 is a front elevation of one form of device for exhibiting moving pictures embodying my invention.

Fig. 2 is a section taken vertically through the device.

Fig. 3 is a diagrammatic view of the means for electrically operating the lights used in conjunction with the device.

Fig. 4 is a side elevation of a form of switch employed in the device, and

Fig. 5 is a fragmentary view showing a top plan of one of the switches.

The device for exhibiting moving pictures has a curtain 10 on which the pictures of the usual, or any preferred form of film, or slide may be projected, and said curtain is composed of a plate of glass, or other translucent material. The glass curtain, or plate 10 is held stationary in a frame, or casing 11 which is preferably substantially rectangular, or square in shape. The frame 11 has a back plate 12, lower and upper walls 13 and 14, and side walls 15 and 16. The walls of the frame extend from one surface of the back plate at an angle with respect thereto, and the part of the walls opposite to the back plate are disposed in similar converging directions, as shown in Fig. 2, so as to encompass the glass curtain. The back plate 12 is thereby disposed in spaced parallel relation to the curtain 10, and upon the inner surface of said back plate as well as upon the inner surface of the walls of the frame may be arranged mirrors, or other reflectors, as 17 and 17$^a$ so as to be adapted to deflect light upon said curtain.

Interiorly of the frame 11, and at closely spaced intervals upon the walls thereof are a suitable number of incandescent lamps, as 18, which are arranged to surround the curtain 10 so that the rays of light therefrom will be deflected by the mirrors 17 and 17$^a$ upon the curtain. The curtain 10, the frame 11, and the lamps 18 may be supported in any preferred manner upon a wall, platform, or other place so that the pictures of a film, or slide may be projected thereon in the usual way through the medium of a projecting machine. The globes of the lamps may consist of any desired number of colors, and may be arranged in any suitable groups, for instance in the drawing are shown six sets of globes, each composed of four colors, such as red 18$^a$, yellow 18$^b$, white 18$^c$, orange 18$^d$, green 18$^e$, and glue 18$^f$ whereby a single color, or combination of colors may be produced when the lamps are lighted for deflection upon the glass curtain in unison with the projection of the pictures thereon.

Serving to permit one or more of the lamps 18 of a single color, or a combination of colors to be simultaneously, or alternately lighted, I provide an electric circuit, as 19, in conjunction with which is employed a switch board, as 20, adapted to be arranged whereby the operator of the projecting machine, or other person may conveniently control the lighting of the lamps. Projecting from each end portion of the board 20 are two posts 21 and 22, and said posts are connected by a rod 23 which is a conductor of electricity. At intervals upon the rod 23 are a number of rotatable knife switches 24, 24ª, 24ᵇ, 24ᶜ, 24ᵈ, 24ᵉ, one for controlling the lighting of each set of the electric globes, and all of said switches are alike in formation. Each of the switches has a sleeve 25. From a part of each of the sleeves 25 extend four blades, or arms 26, 26ª, 26ᵇ, 26ᶜ, and projecting from opposite portions of each of the sleeves is a handle, as 27, by which the switches may be manually swung upon the rod 23. Also upon the board 20 are sets of sockets 28, 28ª, 28ᵇ, 28ᶜ, 28ᵈ, 28ᵉ, and each of said sets is composed of four sockets one being positioned in the path of movement of each of the blades of the switches. All of the sockets may be of the usual form composed of two plates 30 and 30ª arranged, as shown, in close proximity so as to receive one of the blades therebetween. The blades of each of the switches are held upon each of the sleeves 25 in spaced staggered relation so as to be disposed in flared fan-like arrangement whereby the blades will be successively seated in the sockets of each set when one of the switches is swung upon the rod 23.

The circuit 19 is fed from a generator, or dynamo, as 31, or other suitable source of electricity supply. From one pole of the generator 31 is a main transmitting wire 32, and from the second pole of said generator is a second main transmitting wire 33 which is connected to the post 22 of the switch board 20. Each of the red lamps 18ª is connected by a feed wire 34 leading from the transmitting wire 32 to one of the sockets of one set, and likewise each of the yellow lamps 18ᵇ is connected by a wire 35 leading from the wire 32 to one of the sockets of a second set. Each of the white lamps 18ᶜ is connected by a feed wire 36 leading from the transmitting wire 32 to one of the sockets of the third set, and each of the orange lamps 18ᵈ is connected by a wire 37 leading from said wire 32 to one of the sockets of the fourth set. Each of the green lamps 18ᵉ is connected by a wire 38 leading from the transmitting wire 32 to one of the sockets of the fifth set, and each of the blue lamps 18ᶠ is connected by a wire 39 leading from the wire 32 to one of the sockets of the sixth set. By this arrangement when one of the switches 24, 24ª, 24ᵇ, 24ᶜ, 24ᵈ, or 24ᵉ is swung to direct one or more of its blades into the corresponding set of the sockets 28, 28ª, 28ᵇ, 28ᶜ, 28ᵈ, or 28ᵉ the circuit to one or more of the lamps will be closed for deflecting upon the glass curtain 10 a single color, and in a similar manner a combination of colored lights may be thrown upon the curtain by likewise operating one or more of the remaining switches to close the circuit to the other lamps of a desired color.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope of the appended claims.

Having thus described my invention, I claim as new and desire to secure by Letters Patent:—

1. A device for exhibiting moving pictures, comprising a translucent curtain suitably supported whereby pictures may be projected thereon from one side thereof, and means located in proximity to the curtain for causing illumination thereof at spaced portions with colored lights in an opposite direction with respect to the direction of projection of the pictures, whereby colored tints are imparted to the pictures.

2. A device for exhibiting moving pictures, comprising a curtain of translucent material, a frame for said curtain, said frame being supported to permit the projection of pictures on the curtain, lighting means in the frame to the rear of the curtain, and means for controlling the lighting means for illuminating the curtain simultaneously with the projection of pictures thereon.

3. A device for exhibiting moving pictures, comprising a curtain of translucent material, a frame encompassing said curtain, said frame being suitably supported whereby pictures may be projected on the curtain, a plurality of lamps in said frame at the back of the curtain, and electrically operated means for controlling the lamps for illuminating the curtain simultaneously with the projection of the pictures thereon.

4. A device for exhibiting moving pictures, comprising a curtain of translucent material, a frame for said curtain suitably supporting the same whereby pictures may be projected thereon, a plurality of incandescent lamps mounted in the frame for projecting light on to adjacent portions of the curtain, and means for successively lighting one or more of the lamps simultaneously with the projection of pictures on the curtain.

5. A device for exhibiting moving pictures, comprising a curtain of translucent material, a frame for said curtain suitably supporting the same whereby pictures may be projected thereon, a plurality of incandescent lamps mounted in the frame for projecting light on to adjacent portions of the curtain, means for successively lighting one or more of the lamps simultaneously with the projection of pictures on the curtain, and a reflector within the frame for deflecting the rays of light from the lamps upon the curtain so as to tint the pictures being projected thereon.

6. A device for exhibiting moving pictures, comprising a translucent curtain, a frame encompassing said curtain and suitably supporting the same whereby pictures may be projected thereon, reflecting means carried by said frame, a plurality of varicolored incandescent lamps operatively positioned with respect to said reflecting means, and means for controlling the passage of current to said lamps whereby they may be lighted simultaneously with the projection of the pictures on the curtain for tinting the same, substantially as described.

This specification signed and witnessed this eighth day of January, A. D. 1913.

FREDERICK W. HOCHSTETTER.

Witnesses:
ROBT. B. ABBOTT,
M. DERMODY.